P. WOLFF.
OBTAINING TETRACHLORID OF TIN FROM TIN SCRAP AND OTHER MATERIALS CONTAINING TIN.
APPLICATION FILED JUNE 28, 1910.
1,087,523.
Patented Feb. 17, 1914.
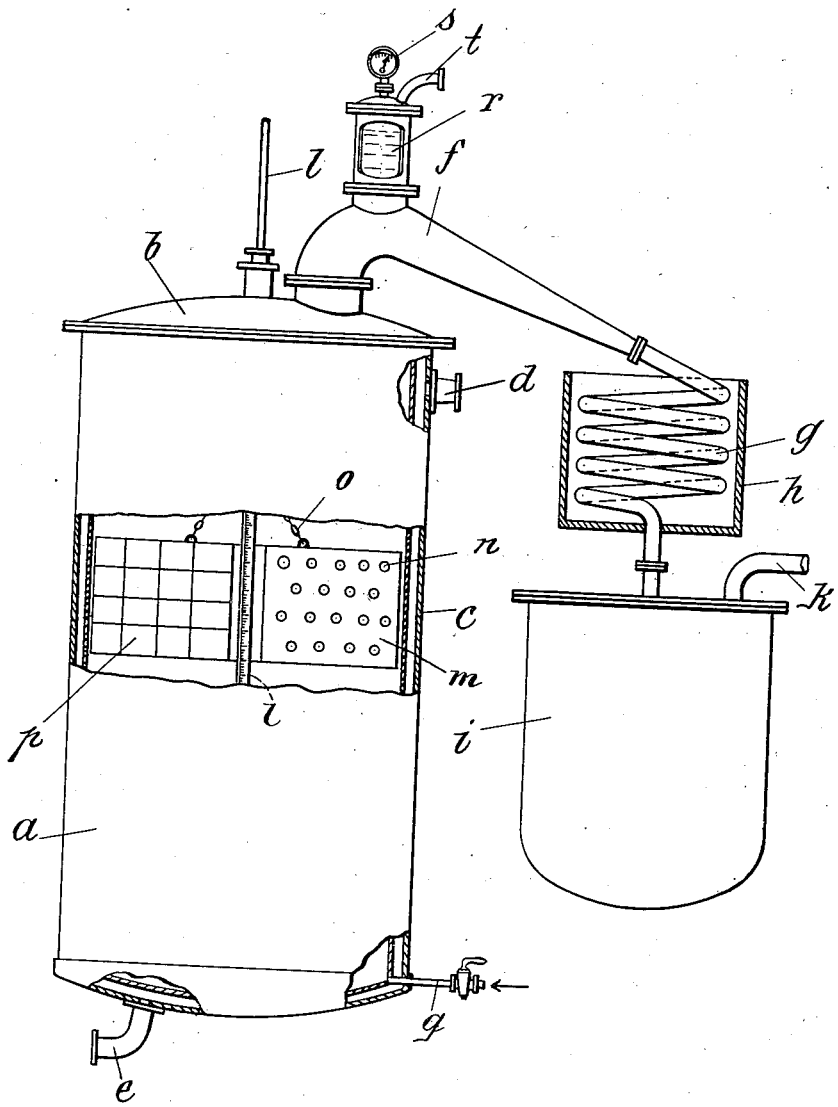
WITNESSES:
INVENTOR
Paul Wolff
BY
Briesen J Knauth
ATTORNEYS

UNITED STATES PATENT OFFICE.

PAUL WOLFF, OF WETZLAR, GERMANY, ASSIGNOR, BY MESNE ASSIGNMENTS, TO VULCAN DETINNING COMPANY, A CORPORATION OF NEW JERSEY.

OBTAINING TETRACHLORID OF TIN FROM TIN-SCRAP AND OTHER MATERIALS CONTAINING TIN.

1,087,523.  Specification of Letters Patent.  Patented Feb. 17, 1914.

Original application filed August 17, 1909, Serial No. 513,353. Divided and this application filed June 28, 1910. Serial No. 569,289.

*To all whom it may concern:*

Be it known that I, PAUL WOLFF, doctor of philosophy, chemist, and a subject of the German Emperor, and resident of Kaiserstrasse 8, Wetzlar, in the Empire of Germany, have invented new and useful Improvements in Obtaining Tetrachlorid of Tin from Tin-Scrap and other Materials Containing Tin, of which the following is a specification.

It being known that tin combines with chlorin to form tetrachlorid of tin, it is obvious that theoretically it is the same whether the tin is in the form of blocks or exists in materials containing tin or the tin coating of tin plate. But all attempts to manufacture commercially tetrachlorid of tin by the simple action of undiluted chlorin has not been practically successful. The chlorin combined not only with tin but, for example, also with iron, that is, either the iron of the tanks in which the chlorin was made to act or the iron of the tin plate clippings which constituted the principal raw material. The generally accepted explanation of this attack on the iron, viz., that it is due to the heat evolved in the conversion of tin into tetrachlorid, is only correct with considerable limitations. Yet it was generally accepted, because, as the vessels in which the reaction was effected were closed and opaque it was difficult to observe closely the phases of the reaction, and consequently, to discover the source of prejudicial secondary reactions. For it must be remembered that an experiment made on a small scale in a laboratory is different from a manufacturing process. Since the heat of combination was considered to be the only cause of the aforesaid secondary reactions, the temperature produced by this heat was diminished by diluting the chlorin with air. The more air the chlorin contains, the slower becomes the reaction. The combustible, tin, is consumed more slowly and the same amount of heat is developed within a longer time. Even in the most recent methods of stripping tin by means of chlorin, chlorin diluted with air is prescribed.

The present method differs from those that are known chiefly in that undiluted chlorin is used.

I have found that it is easy to regulate the temperature of the reaction by diminishing the rate at which the undiluted chlorin is supplied, the effect being the same as that produced by diluting the chlorin with an indifferent gas, as has been the practice hitherto. I have found that it is permissible to allow the temperature of the reaction to rise to 100° C.; for at this temperature pure chlorin does not attack iron; when mixed with stannic chlorid, it does not attack iron even at a much higher temperature. The time which should be occupied by the chlorination may be calculated, and as an example the following data will be assumed: The reaction tank is of 2 meters diameter and 5 meters deep with a surface of 38 square meters, and weighs 6 tons; there are 14 tons of material containing 23.5 per cent. of tin, making the weight of tin 330 kilos. This quantity of tin develops $$330 \times 1078 = 355740 \text{ calories}$$

when converted into tetrachlorid.

The total amount of iron in the tank is 20 tons. If the atmospheric temperature is 20° C., this iron may become heated 80° C., for which are required, the specific heat of iron being 0.1138, $$80 \times 20000 \times 0.1138 = 182080 \text{ calories.}$$

So that there remain:

$$355740 - 182080 = 173660 \text{ calories.}$$

The coefficient of heat permeability of iron being 8, 38 square meters of tank surface will radiate per hour $$38 \times 80 \times 8 = 24320 \text{ calories.}$$

Thus the 173660 calories to be radiated will be dissipated in a little over 7 hours. But under the conditions known at present it is very difficult to regulate the supply of chlorin for 7 hours in such a manner that the quantity of chlorin necessary for the whole reaction is consumed uniformly so as to keep the temperature of reaction as constantly as possible at 100° C. For, when chlorin enters a tank filled with dry goods, the stannic chlorin is partly evaporated into the air contained in the tank, so that thick clouds of stannic chlorid are formed. When the temperature rises, these, together with the air and the chlorin expand and thus increase considerably the pressure in the tank. This circumstance, which is quite beyond human control, rendered it necessary in former processes to supply the mixture of air and chlorin under pressure, as by a pump or by heating it, so that the pressure of the reagent supplied to the tank is higher than the natural reaction pressure. As this latter varies continuously, it is inevitable, that the supply and the consumption of the reagent should become irregular.

The process proceeds better if the air is expelled from the tank and undiluted dry chlorin is used. It does not matter how the air is expelled. As chlorin is heavier than air and mixes with it only slowly, the air can be simply and rapidly expelled by supplying chlorin to the lower part of the tank under as low a pressure as possible and at the same time drawing the air from the upper part of the tank. As soon as the green color of the chlorin becomes visible through a window in the upper part of the tank, the tank is closed, or the supply of chlorin is interrupted.

The known reaction begins after a short time, but no vapor of stannic chlorid is produced because in absence of air the chlorin assumes a liquid condition. For this reason, its volume is small, and in spite of increased temperature there is no pressure; on the contrary, it has been found that the vacuum meter, which had been at 0 (corresponding with a mercury column of 760 millimeters) moved backward to show a negative pressure of about 250 millimeters. This diminished pressure suffices to draw chlorin into the tank, and it is easy so to regulate the supply during the whole process, that the temperature and pressure remain practically constant, and no more chlorin is drawn in than is steadily consumed without affecting the temperature of reaction.

The air can of course also be removed by suction prior to the admission of the chlorin. After the vacuum has been created the process is the following: Undiluted chlorin passes into the evacuated chamber. Before the chlorin begins to unite with the tin, this vacuum is partly destroyed so that the vacuum meter very soon shows 100 to 250 mm. in its mercury column. When the reaction begins, a simple turning of the chlorin cock serves to regulate the current of chlorin, so that the above mentioned pressure may remain permanently constant, as desired. Such a simple and easy regulation of the chlorin supply has not hitherto been possible. As the chlorin is mixed with no other gas which could remain unused in the container, any increase over the desired pressure is impossible. In other words, the chlorination takes place practically under constant pressure. At the same time the chlorin, although mixed with no other gas, is constantly in an attenuated condition; and the greater the vacuum, the more attenuated will be the chlorin and the slower the reaction. By regulating the degree of the vacuum as desired, a means is found for retarding the course of reaction as the same may become necessary. As soon as the temperature falls, and the pressure rises, the process is completed. It is to be noted that this increase in pressure takes place at the end of the detinning process and shows the completeness of the detinning process.

A specific form of apparatus for carrying out the process is shown in the drawing.

$a$ is a chlorination or distillation vessel provided with a cover $b$, and a steam jacket $c$, which during the reaction stage of the process may be used as a cooling jacket. The steam passes in through the joint pipe $d$ and out through the joint pipe $e$; $f$ is the still head; $g$ is a cooling coil placed inside of the cooler $h$; $i$ is the vessel for receiving the product of distillation, which is provided with a suction pipe $k$; $l$ is the thermometer which extends into the vessel from above; $m$ are iron baskets of which a greater or less number is placed into the vessel. These baskets receive the packets of scrap $p$ which are to be detinned. Said baskets are provided with apertures $n$ so as to permit the chlorin to enter as freely as possible. The baskets are provided with chains $o$ for lowering them into and raising them out of the vessel by crane or other means.

$q$ is the inlet pipe for chlorin gas; $r$ an observation glass for the purpose of observing whether the vessel contains chlorin, $s$ a manometer and $t$ a suction pipe.

When I remove the air from the vessel $a$ by suction prior to the introduction of the chlorin gas, I may dispense with the observation glass $r$ and the suction pipe $t$.

Hitherto, the removal of the tetrachlorid of tin from the goods has proved very difficult. So far as the liquid product is concerned the removal is easy, for this portion collects at the bottom of the tank and may be tapped and distilled as a separate process. For removing the considerable quantities remaining in the goods, Goldschmidt proposed to evacuate the tank and fill it with hot, dry air; this air having mixed with the vapors was to be drawn off by a pump. Experience has shown that this is very slow. It requires much more time than the process itself. Moreover, considerable quantities of air are necessary and the air must not only be heated but also dried by sulfuric acid or chlorid of calcium. All this is very expensive.

I have found a mode of distilling not only the portion of the tetrachlorid attached to the goods, but the total product in such a manner that the distillate can, without further preparation, be used for weighting silk. This appears impossible at first sight, to distil the product through the whole charge of entangled and compressed tin plate clippings. A simple distillation is impracticable, because in order to overcome the total resistance offered by the metal clippings a temperature would be necessary which could not be employed in practice. But if during distillation a continuous suction is applied, which is of greater intensity then the suction due to any reduced pressure which may exist in the tank, the chlorid of tin passes over completely and in a remarkably short time. The product thus obtained is tetrachlorid of tin, clear as water and free from chlorin, iron or like impurity, being a marketable product almost chemically pure.

It is very easy to heat the tank to the boiling point of tetrachlorid of tin because its contents are, or may be, already at 100° C. owing to the heat of reaction. As tetrachlorid of tin boils at 114° C., an increase in temperature of only 14° C. would be necessary. According to the degree of diminution of the pressure however, tin tetrachlorid boils at 100° C. and even at temperatures below that. I have found that at 360 m. m. mercury the tetrachlorid boils at 100° C. Since, as already stated, it is possible to maintain such a low pressure during the process when undiluted chlorin is used it is possible to distil intermittently even before the process is finished, as soon as the temperature has risen to 100° C. and a sufficient quantity of tetrachlorid has formed. From this it follows that the advantage of employing undiluted chlorin in the manner specified is not limited to diminishing the rate of the reaction, which might also be obtained by other means. The chlorin withdrawn from the process by this distillation may be returned to the process or may be condensed in a known manner in suitable aqueous solutions together with any vapor of tetrachlorid carried by the chlorin. Such carried vapor is, however very small in quantity owing to the low vapor tension of the tetrachlorid of tin.

A further advantage of the distillation under diminished pressure is its applicability for purifying tetrachlorid of tin containing chlorin. In all known methods a more or less considerable excess of chlorin in the tetrachlorid of tin is scarcely to be avoided. A simple re-distillation does not suffice to remove the excess of chlorin, because the chlorin is always carried over again. In the distillation under diminished pressure, on the contrary, the chlorin is continuously removed.

It is obvious that distillation under diminished pressure may also be employed for winning tetrachlorid of tin by means of chlorin from materials containing tin other than tin plate clippings. Here also the result will be that pure tetrachlorid of tin is obtained.

It is, of course, essential that not only must the process be conducted under perfectly dry conditions but that the goods used must be sufficiently dry.

The characteristics of the process are the facts: (1) that undiluted chlorin is used, air being excluded or expelled; (2) that tetrachlorid of tin is obtained as a marketable product directly from the tank by distillation under diminished pressure.

I claim:

1. In the process of obtaining tetrachlorid of tin by treating tin scrap and other materials containing tin, with chlorin, the improvement which consists in removing the tetrachlorid of tin so formed from the scraps by direct distillation therefrom under less than atmospheric pressure, substantially as described.

2. In the process of obtaining tetrachlorid of tin by treating tin scrap and other materials containing tin, with chlorin, the improvement which consists in removing the tetrachlorid of tin so formed from the scraps by direct distillation therefrom under less than atmospheric pressure and by suction, substantially as described.

3. In the process of obtaining tetrachlorid of tin by treating tin scrap and other materials containing tin, with chlorin, the improvement which consists in removing the tetrachlorid of tin by distillation under less than atmospheric pressure and by suction in such a manner that the boiling point of the tetrachlorid of tin is reduced to about 100° C., substantially as described.

In testimony whereof I have hereunto set my hand in the presence of two subscribing witnesses.

PAUL WOLFF.

Witnesses:
Hans von Schütz,
Hugo Heilinger.